United States Patent [19]

Dewhurst et al.

[11] Patent Number: 4,789,688
[45] Date of Patent: Dec. 6, 1988

[54] RIM POLYURETHANE COMPOSITIONS CONTAINING INTERNAL MOLD RELEASE AGENTS

[75] Inventors: John E. Dewhurst, Oakdale; Stephen J. Harasin, Bethel Park, both of Pa.

[73] Assignee: Mobay Corporation, Pittsburgh, Pa.

[21] Appl. No.: 146,075

[22] Filed: Jan. 20, 1988

Related U.S. Application Data

[63] Continuation-in-part of Ser. No. 6,529, Jan. 23, 1987.

[51] Int. Cl.$^4$ ............................................. C08G 18/30
[52] U.S. Cl. ................... 521/110; 521/112; 521/115; 521/116; 521/121; 521/128; 524/714; 524/718; 524/720; 524/730; 524/731; 524/773; 528/52; 528/53; 528/54; 528/63; 528/64; 528/66; 528/73; 528/74.5; 264/51
[58] Field of Search ............... 264/51; 521/110, 112, 521/115, 116, 121, 128; 524/714, 718, 720, 730, 731, 773; 528/52, 53, 54, 63, 64, 66, 73, 74.5

[56] References Cited

U.S. PATENT DOCUMENTS

| | | | |
|---|---|---|---|
| 4,076,695 | 2/1978 | Keil | 260/77.5 |
| 4,379,100 | 4/1983 | Salisbury et al. | 264/39 |
| 4,396,729 | 8/1983 | Dominquez et al. | 521/51 |
| 4,420,570 | 12/1983 | Dominquez | 521/112 |
| 4,472,341 | 9/1984 | Alberino et al. | 264/300 |

Primary Examiner—John Kight
Assistant Examiner—Samuel A. Acquah
Attorney, Agent, or Firm—Gene Harsh; Joseph C. Gil; Thomas W. Roy

[57] ABSTRACT

The present invention is directed to a process for the production of optionally cellular, polyurethane elastomer moldings or optionally cellular, rigid structural polyurethanes by reacting a reaction mixture containing
(i) a polyisocyanate,
(ii) a high molecular weight polymer having at least two hydroxy groups and having a molecular weight of 400 to about 10,000,
(iii) about 5 to 50% by weight, based on the weight of component (ii) of a chain-extender having at least two hydroxy groups and
(iv) about 0.05 to 10 weight percent, based on the weight of components (ii) and (iii) of a salt based on a carboxy functional siloxane and an amidine group-containing compound of the formula

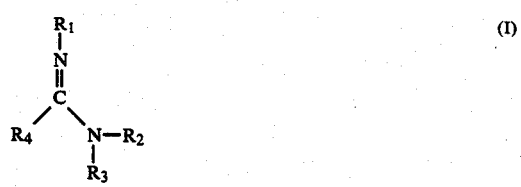

wherein
$R_1$, $R_2$ and $R_3$ are straight or branched, saturated or unsaturated hydrocarbon chains having up to 30 carbon atoms which may optionally be substituted by ether groups, ester groups, amide groups or amidine groups and may also optionally be terminated by isocyanate-reactive groups such as hydroxyl or amino groups,
$R_4$ corresponds to the definition of $R_1$, $R_2$ and $R_3$, but may additionally represent an aromatic substituent having 6 to 15 carbon atoms or may represent the group —$NR_2R_3$ and
$R_1$, $R_2$, $R_3$ and $R_4$ may, with one or both of the amidine nitrogens, also form a heterocyclic ring.

The present invention is also directed to the amidine group-containing salt (iv) and to a polyol composition based on components (ii), (iii) and (iv).

11 Claims, No Drawings

RIM POLYURETHANE COMPOSITIONS CONTAINING INTERNAL MOLD RELEASE AGENTS

CROSS-REFERENCE TO RELATED APPLICATION

The present application is a continuation-in-part of U.S. Application Ser. No. 006,529 filed on Jan. 23, 1987.

BACKGROUND OF THE INVENTION

1. Field of the Invention

The present invention is directed to an internal mold release composition suitable for use in the production of optionally cellular, polyurethane elastomers or optionally cellular, rigid structural polyurethanes by the reaction injection molding (RIM) process.

2. Description of the Prior Art

Polyurethanes having an impervious outer skin (integral skin) and an optionally cellular core are well known and suitable for many uses. Such polyurethanes are generally produced by introducing a reaction mixture based on polyisocyanates, isocyanate-reactive compounds and other additives into closed molds such that the reaction mixture fills the mold and reproduces the inner surface thereof. In order to prevent the molded article from adhering to the surface when the mold is opened, the mold is generally coated with a release agent. Examples of release agents currently in use include waxes, soaps, and oils. These external release agents form a thin film between the surface of the mold and the molded article. This thin film assists in preventing the molded article from adhering to the mold and thus enables the article to be readily removed from the mold.

This method has a number of disadvantages where mass production is desired. For instance, the release agent has to be applied at regular intervals, and during that period the mold is out of service. Also, fine engravings on the mold surface such as imitation wood or leather grain, become covered with residues of release agents over a period of time. The removal of these firmly adhering residues from very complicated molds involves considerable time and expense. Further, the molded articles are also coated with a thin film of release agent which causes adhesion problems when subsequently painted.

One solution to this problem has been to include a mold release agent in the reaction mixture so that it is possible to reduce or eliminate the separate application of an external mold release agent. U.S. Pat. No. 4,076,695 discloses the incorporation of carboxy functional siloxanes into the polyurethane reactants to be used in a reaction injection molding process in order to aid the release of the molded article from the mold. One difficulty with this approach is that the carboxy functional siloxanes react with the tin catalysts conventionally used to promote polyurethane formation resulting in insoluble adducts which no longer provide mold release properties.

Various solutions have been suggested to overcome this problem. U.S. Pat. No. 4,379,100 discloses a three stream system wherein the polyol component is divided into two portions, one containing the tin catalyst and the other containing the carboxy functional siloxane mold release agent. A second method of overcoming the problems with the use of carboxy functional siloxanes is disclosed in U.S. Pat. No. 4,420,570 wherein the tin catalyst is blended with the polyisocyanate component, while the carboxy functional siloxane is blended with the polyol component in order to keep them separate.

In a third solution to the problem, U.S. Pat. No. 4,396,729 discloses replacing the conventional high molecular weight polyol with an aminated polyol. Since no hydroxyl groups are present, it is not necessary to use an organo metallic catalyst and, thus, these catalysts are not present to interact with the carboxy functional siloxanes. U.S. Pat. No. 4,472,341 discloses a fourth solution to this problem wherein the acid group of the carboxy functional siloxane is chemically derivatized to form a new compound which does not interact with the organo metallic catalyst.

Even though these solutions presented in the above-identified patents do solve the problem of the interaction between the carboxy functional siloxane and the tin catalyst, there are disadvantages to these solutions. For example, it is very difficult to accurately meter three streams and, thus, this system is not used commercially. The addition of tin catalysts to the polyisocyanate component reduces the storage stability of this component, while the use of amino polyethers excludes the use of hydroxyl group-containing reactants. Finally, the formation of derivatives of the carboxy functional siloxanes reduces the mold release effects of these compounds.

Accordingly, it is an object of the present invention to provide mold release compositions which are storage stable, provide multiple releases and do not require special reactants or apparatus for processing. It is also an object of the present invention to provide mold release compositions which do not degrade the properties normally associated with these optionally cellular polyurethane elastomers. Surprisingly, these objects may be achieved in accordance with the invention described hereinafter.

SUMMARY OF THE INVENTION

The present invention is directed to a process for the production of optionally cellular, polyurethane elastomers or optionally cellular, rigid structural polyurethanes by reacting a reaction mixture containing (i) a polyisocyanate,
(ii) a high molecular weight polymer having at least two hydroxy groups and having a molecular weight of 400 to about 10,000,
(iii) up to about 150% by weight, based on the weight of component (ii) of a chain-extender having at least two hydroxy groups and
(iv) about 0.05 to 10 weight percent, based on the weight of components (ii) and (iii) of a salt based on a carboxy functional siloxane and an amidine group-containing compound of the formula

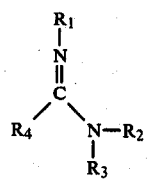

(I)

wherein $R_1$, $R_2$ and $R_3$ are straight or branched, saturated or unsaturated hydrocarbon chains having up to 30 carbon atoms which may optionally be substituted by ether groups, ester groups, amide groups or amidine groups and may also optionally be terminated by isocyanate-reactive groups such as hydroxyl or amino groups, $R_4$ corresponds to the definition of $R_1$, $R_2$ and $R_3$, but may additionally represent an aromatic substituent having 6 to 15 carbon atoms or may represent the group $-NR_2R_3$ and $R_1$, $R_2$, $R_3$ and $R_4$ may, with one or both of the amidine nitrogens, also form a heterocyclic ring.

The present invention is also directed to the amidine group-containing salt (iv) and to a polyol composition based on components (ii), (iii) and (iv).

DETAILED DESCRIPTION OF THE INVENTION

The mold release agent mixture may also contain (v) an optionally alkoxylated fatty amide or a salt of a aliphatic carboxylic acid and a primary amine or a primary, secondary or tertiary amine containing an amide or an ester group and also (vi) a tertiary amine-containing, isocyanate reactive compound corresponding to the formula

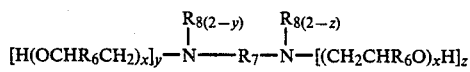

$$[H(OCHR_6CH_2)_x]_y - N \overset{R_{8(2-y)}}{\underset{}{\rule{0pt}{0pt}}} - R_7 - N \overset{R_{8(2-z)}}{\underset{}{\rule{0pt}{0pt}}} - [(CH_2CHR_6O)_xH]_z \quad (VI)$$

wherein $R_6$ is a straight or branched alkyl radical having 1 to 4 carbon atoms, $R_7$ is an alkylene, dialkylene ether or polyether diradical, $R_8$ is a straight or branched, saturated or unsaturated, hydrocarbon chain having up to 30 carbon atoms which may optionally be substituted by ether, ester or amide groups, x is independently a number of from about 1 to 50, and y and z are independently 0, 1 or 2 with the proviso that y+z must be at least 1.

The mold release compositions of the present invention are suitable for use with either flexible or rigid, optionally cellular, polyurethane elastomers. The molded articles may possess various combinations of these properties such as rigid, non-cellular elastomers or flexible, cellular products for use, e.g., as shoe soles.

In accordance with the present invention it has been discovered that the previous difficulties regarding the compatibility of the carboxy functional siloxanes with tin catalysts may be overcome by forming a salt of the siloxanes with a compound containing an amidine group as discussed hereinafter. In addition, it has been found that the number of releases may be even further increased, especially in rigid systems, by incorporating the salts discussed hereinafter and disclosed in U.S. Pat. No. 3,726,952. Finally, it has been discovered that the ease of release of the first few releases may be improved by adding specific tertiary amine group-containing compounds to be discussed hereinafter.

Suitable polyisocyanates for use in the present invention are the aliphatic, cycloaliphatic, araliphatic, aromatic and heterocyclic polyisocyanates which are known and described for example by W. Siefken in Justus Liebigs Annalen der Chemie, 562, pages 75–136. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures thereof, 1-isocyanato-3,3,5-trimethyl-5-isocyanatomethyl-cyclo-hexane (isophorone diisocyanate or IPDI), 2,4- and 2,6-hexahydrotoluylene diisocyanate and mixtures thereof, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-toluylene diisocyanate and mixtures thereof, diphenyl methane 2,4'- and/or 4,4'-diisocyanate, naphthylene 1,5-diisocyanate, triphenyl methane-4,4',4''-triisocyanate and polyphenyl polymethylene polyisocyanates of the type obtained by condensing aniline with formaldehyde, followed by condensation.

It is preferred to use the readily available polyisocyanates such as 2,4- and 2,6-toluylene diisocyanate and mixtures of these isomers, polyphenyl polymethylene polyisocyanates of the type obtained by condensing aniline with formaldehyde, followed by phosgenation, and polyisocyanates containing carbodiimide groups, urethane groups, allophanate groups, isocyanurate groups, urea groups or biuret groups. Particularly preferred are the liquid derivatives of 4,4'-diphenyl methane diisocyanate (MDI) which may be liquidfied inter alia by introducing carbodiimide groups, blending with 2,4'-diphenyl methane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as the polyisocyanate component are isocyanate-terminated prepolymers based on the above-mentioned polyisocyanates and the polyhydroxyl compounds disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Other suitable reactants for preparing the polyurethane elastomers of the present invention include compounds containing at least two hydroxy groups. These compounds may be divided into two groups, high molecular weight compounds having a molecular weight of 400 to about 10,000 and low molecular weight compounds, i.e. chain extenders, having a molecular weight of 62 to 399. Examples of suitable polyols include the polyesters, polyethers, polythioethers, polyacetals and polycarbonates containing at least 2, preferably 2 to 8 and most preferably 2 to 4 hydroxy groups of the type known for the production of polyurethanes.

In accordance with the present invention, the high molecular weight polyhydroxyl compounds are used in admixture with up to about 150% by weight, preferably about 5 to 150% by weight, more preferably about 5 to 95% by weight and most preferably about 5 to 50% by weight, based on the total quantity of polyhydroxyl compounds, of the low molecular weight chain extenders. Examples of these chain extenders include ethylene glycol, 1,2- and 1,3-propane diol, 1,3-, 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of BF₃ or by chemically adding these epoxides, preferably ethylene oxide and propylene oxide in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g. reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the aboveidentified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32-4 and 44-54, and Volume II, 1964, pages 5-6 and 198-199: and in Kunststoff-Handbuch, Vol. VII, Vieweg-Hochtlen, Carl Hanser Verlag, Munich, 1966, pages 45-71.

The mold release compositions to be used in combination with the previously described reactants for forming polyurethane elastomers, include as a principle component, a salt formed from a carboxy functional siloxane such as disclosed in U.S. Patent 4,076,695, herein incorporated by reference, and a compound containing an amidine group of the following formula

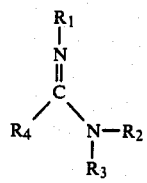

(I)

wherein
R₁, R₂ and R₃ are straight or branched, saturated or unsaturated hydrocarbon chains having up to 30, preferably up to 22 carbon atoms which may optionally be substituted by ether groups, ester groups, amide groups or amidine groups and may also optionally be terminated by isocyanate-reactive groups such as hydroxyl or amino groups.

R₄ corresponds to the definition of R₁, R₂ and R₃, but may additionally represent an aromatic substituent having 6 to 15 carbon atoms or may represent the group —NR₂R₃ and R₁, R₂, R₃ and R₄ may, with one or both of the amidine nitrogens, also form a heterocyclic ring.

Suitable examples of carboxy functional siloxanes are disclosed in U.S. Pat. No. 4,076,695 and include Dow Corning's Q2-7119 which is a polysiloxane containing substituents corresponding to the formula

(II)

Examples of suitable amidine group-containing compounds include diazabicycloundecene, the tetraalkyl guanidines such as tetramethyl guanidine, cyclic amidines of the above formula I wherein R₁ and R₂ form heterocyclic ring such as compounds corresponding to the formula

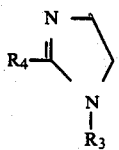

(III)

wherein R₄ contains a saturated or unsaturated fatty group having 8 to 30, preferably 8 to 22 carbon atoms such as 1-heptadec-8-7-enyl or preferably 1-heptadecyl and R₃ is as defined above, but may also contain an additional amidine group. Commercial examples of amidine group containing compounds corresponding to formula III are Monazoline O available from Mona Industries, wherein R₄ is 1-heptadec-8-7-enyl and R₃ is hydroxy ethyl: Monazoline S available from Mona Industries, wherein R₄ is 1-heptadecyl and R₃ is hydroxy ethyl: Varisoft 475 available from Sherex Chemical, wherein R₄ is a mixture of saturated and unsaturated hydrocarbons and R₃ corresponds to the formula

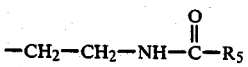

(IV)

wherein R₅ corresponds to R₄; and Monazoline B-219 available from Mona Industries, wherein R₄ is 1-heptadecyl and R₃ corresponds to the formula

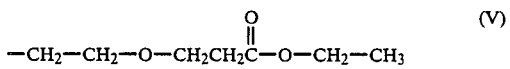

$$-CH_2-CH_2-O-CH_2CH_2\overset{\overset{O}{\|}}{C}-O-CH_2-CH_3 \quad (V)$$

A further ingredient which assists in compatibilizing the amidine group containing salt in the polyol component of the present invention, especially in rigid polyurethane elastomers, is preferably a salt of an aliphatic carboxylic acid and a primary amine or a primary, secondary or tertiary amine containing an amide or an ester group. These salts are disclosed in U.S. Pat. No. 3,726,952, herein incorporated by reference in its entirety, at column 5, line 22 through column 6, line 55. A preferred salt is the oleic acid or tall oil fatty acid salt of the amide group containing amine obtained by reacting N,N-dimethylamino propylamine with oleic acid or tall oil fatty acid. Also suitable are fatty amides such as oleic acid amide, preferably alkoxylated fatty amides and most preferably ethoxylated fatty amides such as ethoxylated oleic acid amide. However, the fatty amides or their derivatives are not as preferred as the above described salts from U.S. Pat. No. 3,726,952.

An optional additive which may be included in the mold release composition according to the present invention is a tertiary amine containing, isocyanate reactive compound corresponding to the formula

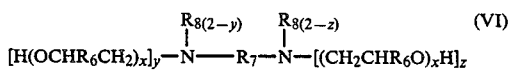

$$[H(OCHR_6CH_2)_x]_y-\overset{\overset{R_{8(2-y)}}{|}}{N}-R_7-\overset{\overset{R_{8(2-z)}}{|}}{N}-[(CH_2CHR_6O)_xH]_z \quad (VI)$$

wherein $R_6$ is a straight or branched alkyl radical having 1 to 4 carbon atoms, preferably methyl, $R_7$ is an alkylene, dialkylene ether or polyether diradical, which has a molecular weight of up to 5000, preferably less than 400, more preferably less than 100, and most preferably $R_7$ is a $C_2$-$C_3$ alkylene radical, $R_8$ is a straight or branched, saturated or unsaturated hydrocarbon chain having up to 30, preferably up to 22 carbon atoms which may optionally be substituted by ether, ester or amide groups, x is independently a number of from about 1 to 50, preferably about 1 to 20, more preferably about 1 to 5 and most preferably about 1 to 3 and y and z are independently 0, 1 or 2 with the proviso that y +z must be at least 1.

Examples of these compounds include an ethylene diamine-based polyether polyol (supplied as Multranol 4050 from Mobay) and more preferably, a compound (Ethoduomeen T-13 available from Akzo Chemie) of the formula

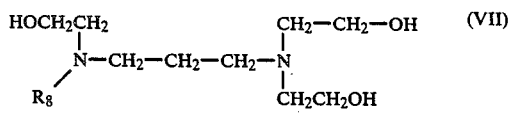

$$\begin{array}{c} HOCH_2CH_2 \\ \diagdown \\ R_8 \diagup \end{array} N-CH_2-CH_2-CH_2-\overset{\overset{CH_2-CH_2-OH}{|}}{N}-CH_2CH_2OH \quad (VII)$$

wherein $R_8$ is defined as above.

The amidine group containing compound should be present in an amount of about 0.05 to 10, preferably about 0.1 to 5 and most preferably about 0.2 to 1.0 weight percent, based on the weight of the polyol component. The optional release agent should be present in an amount of up to about 10, preferably up to about 5 and most preferably about 1 to 5 weight percent, based on the weight of the polyol component. Finally, the tertiary amine containing, isocyanate-reactive compound should be present in an amount of up to about 10, preferably up to about 8.5, more preferably about 2 to 6 weight percent, based on the weight of the polyol component.

Other additives which may be used in the molding compositions of the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the polyol component.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid, ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids such as ricinoleic acid or polymeric fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The compositions according to the present invention may be molded using conventional RIM processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, chain extender, the internal mold release agent mixture and any other additive which is to be included.

The invention is further illustrated but is not intended to be limited by the following examples in which all parts and percentages are by weight unless otherwise specified.

EXAMPLES

DESCRIPTION OF MATERIALS

Amidine Salt I

Amidine Salt I was prepared by adding 880.2 parts (12.1%) of 2-(1-heptadecyl)-3-(2-hydroxyethyl)-2-imidazoline to 6377.4 parts of Dow Corning's Q2-7119, a carboxy functional siloxane, at 80° with stirring. When all of the solids had dissolved, the mixture was allowed to cool to room temperature.

Amidine Salt II

Following the above procedure, Amidine Salt II was prepared from 880.2 parts of 2-(1-heptadecyl)-3-(2-hydroxyethyl)-2-imidazoline and 3188.7 parts of Dow Corning's Q2-7119.

Amidine Salt III

Following the above procedure, Amidine Salt III was prepared from 440.1 parts of 2-(1-heptadecyl)-3-(2-steramidoethyl)-2-imidazoline and 3188.7 parts of Dow Corning's Q2-7119.

Amidine Salt IV

Following the above procedure, Amidine Salt IV was prepared from 632 parts of 2-(1-heptadecyl)-3-(2-ethoxyformylethoxyethyl)-2-imidazoline and 3611.4 parts of Dow Corning's Q2-7119.

Amidine Salt V

Following the above procedure, Amidine Salt V was prepared from 440.1 parts of 2-(1-heptadec-8-7-enyl) 3-(2-hydroxyethyl)-2-imidazoline and 3188.7 parts of Dow Corning's Q2-7119.

Amidine Salt VI

Following the above procedure, Amidine Salt VI was prepared from 138.2 parts of 1,8-diazabicyclo[5.4.0]undec-7-ene and 2500 parts of Dow Corning's Q2-7119.

Amidine Salt VII

Following the above procedure, Amidine Salt VII was prepared from 180 parts of 2-(1-heptadecyl)-3-(2-hydroxyethyl)-2-imidazoline and 2820 parts of Dow Corning's Q2-7119.

POLYOL A—a 45/55 mixture of glycerine initiated poly(oxyalkylene)-polyether triols, one having a hydroxyl number of 28 and based on 82.5% propylene oxide tipped with 17.5% ethylene oxide and the other having a hydroxyl number of 1058 and based on 100% propylene oxide.

POLYOL B—a propylene glycol initiated polyether diol based on 80% propylene oxide tipped with 20% ethylene oxide and having an OH number of 28.

POLYOL C—a dispersion of 20% of a TDI/hydrazine adduct prepared in 80% of a glycerine-initiated polyether triol based on 83% propylene oxide tipped with 17% ethylene oxide and having an OH number of 35.

SURFACTANT A—a commercial silicone surfactant supplied as DC-193 by Dow Corning.

SURFACTANT B—a commercial silicone surfactant supplied as L-5307 by Union Carbide.

SURFACTANT C—a commercial silicone surfactant supplied as Tegosioxin 20,000 by Goldschmidt.

COMBUSTION MODIFIER A—a neutral cyclic phosphorus ester containing 21% phosphorus available as Antiblaze 19 from Albright and Wilson.

TIN CATALYST I—dibutyl tin dilaurate supplied as Thermalite 12 by M&T Chemical or as Fomrez SUL-4 by Witco.

TIN CATALYST II—dimethyl tin mercaptide supplied as Fomrez UL-22 by Witco.

AMINE CATALYST I—N,N-dimethylcyclohexylamine supplied as Polycat 8 by Air Products.

AMINE CATALYST II—triethylene diamine, supplied as a 33% solution in a glycol carrier as Dabco 33LV by Air Products or as Thancat TD-33 by Texaco.

BLOWING AGENT A—fluorotrichloromethane, supplied as Freon R-11 by DuPont or Isotron 11 by Pennwalt.

POLYOL RESIN A—a blend of 91.5 parts Polyol A, 3 parts Surfactant A, 0.25 parts Tin Catalyst II, 1.5 parts Amine Catalyst I, 19 parts Combustion Modifier A and 4 parts Blowing Agent A.

POLYOL RESIN B—a blend of 91.5 parts Polyol A, 3 parts Surfactant A, 0.25 parts Tin Catalyst I, 1.5 parts Amine Catalyst I, 19 parts Combustion Modifier A and 8 parts Blowing Agent A.

POLYOL RESIN C—a blend of 68.40 parts Polyol B, 13.52 parts Polyol C, 7.22 parts 1,4-butane diol, 0.76 parts Amine Catalyst II, 0.03 parts Tin Catalyst I, 0.11 parts Surfactant B, 0.09 parts Surfactant C, 7.01 parts Blowing Agent A and 0.16 parts water.

Polyisocyanate I—a liquid semi-prepolymer prepared by reacting 4,4'-diphenylmethane diisocyanate and tripropylene glycol in a molar ratio of about 5:1 to provide a product having an NCO content of about 23% and a viscosity at 25° C. of 725±175 cps.

Polyisocyanate II—an aniline/formaldehyde condensation product containing 4,4'-diphenylmethane diisocyanate and about 50% of higher functionality homologs, having an NCO content of about 31.5% and a viscosity at 25° C. of 200 cps.

SURFACE ACTIVE AGENT A—the tall oil salt of the amide group-containing compound obtained by reacting N,N-dimethylaminopropylamine with tall oil.

SURFACE ACTIVE AGENT B—the reaction product of oleic acid amide with 7 moles of ethylene oxide.

SURFACE ACTIVE AGENT C—oleic acid amide.

AMINE INITIATED POLYOL I—N,N',N'-tris(2-hydroxyethyl)-N-tallow-1,3-diamino-propane.

AMINE INITIATED POLYOL II—the 1:1 molar salt of Amine Initiated Polyol I with tall oil.

AMINE INITIATED POLYOL III—propoxylated ethylene diamine (OH number 630).

AMINE INITIATED POLYOL IV—the 1:1 molar salt of Amine Initiated Polyol III with tall oil.

EXAMPLES 1–24

Examples 1–24 were conducted on an HK-100 (available from Hennecke) RIM machine under the following conditions:

| Mixhead type - 10 millimeter chamber, two-component (available from Krauss-Maffei) | |
|---|---|
| Weight ratio, polyisocyanate/resin blend | 130/100 |
| Injection rate, pounds per second | 1 |
| Mold temperature °F. | 160 |
| Part weight, pound | 1.2 |
| Resin blend, density g/cc | 0.80 |
| Material temperature °F. | |
| Polyisocyanate Component | 95 |
| Resin Component | 95 |
| Mix pressures, psi | |
| Polyisocyanate Component | 2500 |
| Resin Component | 2500 |
| Demold time, minutes | 2 |

The examples were conducted using the components set forth in Tables I and II to produce a 12″ × 12″ × ¼″ test panel. Each example was continued to determine the number of release before the part became difficult to remove or when the parts became destroyed or damaged at demold because of the adherence of the part to the mold surface. In Table II (Examples 11–24) the wax base coat set forth in Table I was used in all of the examples. The polyisocyanate component is a 50/50 blend of Polyisocyanate I and II. The external wax release agent was Chem-Trend CT 2001: the external soap release agent was Chem-Trend RCTW 2006.

TABLE I

| Example | 1 | 2 | 3 (Comparison) | 4 | 5 | 6 | 7 | 8 | 9 | 10 |
|---|---|---|---|---|---|---|---|---|---|---|
| Polyol Resin | B,96.5 | B,91.5 | A,100.0[1] | A,91.5 | A,91.5 | A,91.5 | A,91.5 | A,91.5 | A,91.5 | A,91.5 |
| Amidine Salt | I,3.5 | I,3.5 | — | I,3.5 | I,3.5 | I,3.5 | V,3.5 | V,3.5 | VI,3.5 | VI,3.5 |
| Amine Initiated Polyol | — | I,5 | — | I,5 | I,5 | I,5 | I,5 | I,5 | I,5 | I,5 |
| Surface Active Agent | A,6 | A,6 | — | — | A,6 | A,6 | A,6 | A,6 | A,6 | A,6 |
| External Base Coat | Wax | Wax | Wax | Wax | Wax | Soap | Wax | Soap | Wax | Soap |
| Number of Releases | 40 | 40+ | 5 | 19 | 40+ | 30+ | 40+ | 15 | 40+ | 12 |

[1] Contained Tin Catalyst I instead of II

TABLE II

| Example | 11 | 12 | 13 | 14 | 15 | 16 | 17 | 18 | 19 | 20 | 21 | 22 | 23 | 24 |
|---|---|---|---|---|---|---|---|---|---|---|---|---|---|---|
| Polyol Resin A | 95.75 | 93.2 | 93.2 | 93.6 | 86.5 | 88.5 | 91.5 | 91.5 | 91.5 | 91.5 | 91.5 | 91.5 | 91.5 | 91.5 |
| Amidine Salt | I,1.8 | I,1.8 | I,1.8 | I,2.6 | II,8.6 | II,5 | I,3.5 | I,3.5 | I,3.5 | I,3.5 | I,3.5 | III,3.5 | VII,3.5 | IV,3.5 |
| Amine Initiated Polyol | I,2.5 | I,5 | I,3.8 | I,3.8 | I,5 | I,5 | III,5 | II,5 | IV,5 | I,5 | I,5 | I,5 | I,5 | I,5 |
| Surface Active Agent | A,6 | A,6 | A,6 | A,6 | A,6 | A,6 | A,6 | — | — | B,6 | C,6 | A,6 | A,6 | A,6 |
| Number of Releases | 10 | 40 | 40 | 20 | 70 | 25 | 40 | 19 | 15 | 19 | 8 | 20 | 40 | 40 |

EXAMPLES 25-29

Examples 25-29 were conducted in a DESMA PSA-70 machine using Polyisocyanate I as the polyisocyanate component and using the polyol components set forth in Table III. The two components were blended and injected into a shoe sole mold through a mixhead under low pressure. The number of releases were determined before the part became damaged upon removal or until there was some adherence of the polyurethane material to the surface of the mold.

TABLE III

| Example | 25 | 26 | 27 | 28 | 29 |
|---|---|---|---|---|---|
| Polyol Resin | C,97.3 | C,97.3 | C,92.32 | C,90.0 | C,92.32 |
| Amidine Sale | I,2.70 | II,2.70 | II,2.56 | I,5.0 | I,2.56 |
| Surface Active Agent | — | — | A,5.12 | A,5.0 | A,5.12 |
| Number of Releases | 24 | 5 | 11 | 13 | 8 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an optionally cellular, polyurethane elastomer or an optionally cellular, rigid structural polyurethane by reacting a reaction mixture comprising
   (i) a polyisocyanate, (ii) a high molecular weight polymer having at least two hydroxy groups and a molecular weight of 400 to about 10,000,
   (iii) up to about 150% by weight, based on the weight of component (ii) of a chain extender having at least two hydroxy groups and
   (iv) about 0.05 to 10% by weight, based on the weight of components (ii) and (iii), of a salt based on a carboxy functional siloxane and an amidine group-containing compound of the formula

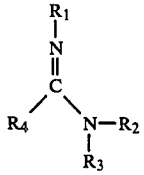

(I)

wherein
$R_1$, $R_2$ and $R_3$ are straight or branched, saturated or unsaturated hydrocarbon chains having up to 30 carbon atoms which may optionally be substituted by ether groups, ester groups, amide groups or amidine groups and may also optionally be terminated by isocyanate-reactive groups,
$R_4$ corresponds to the definition of $R_1$, $R_2$ and $R_3$, but may additionally represent an aromatic substituent having 6 to 15 carbon atoms or may represent the group $-NR_2R_3$ and
$R_1$, $R_2$, $R_3$ and $R_4$ may, with one or both of the amidine nitrogens, also form a heterocyclic ring.

2. The process of claim 1 wherein the reaction mixture is processed as a one-shot system by the RIM process using an isocyanate index of about 70 to 120.

3. The process of claim 1 wherein reaction mixture additionally comprises a salt of an aliphatic carboxylic acid and a primary amine or a primary, secondary or tertiary amine containing an amide or an ester group.

4. The process of claim 1 wherein said reaction mixture additionally contains a tertiary amine-containing, isocyanate-reactive compound corresponding to the formula

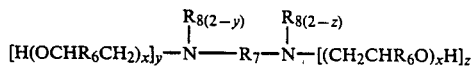

wherein
$R_6$ is a straight or branched alkyl radical having 1 to 4 carbon atoms, R7 is an alkylene, dialkylene ether or polyether diradical, R8 is a straight or branched, saturated or unsaturated hydrocarbon chain having up to 30 carbon atoms which may optionally be substituted by ether, ester or amide groups, x is independently a number of about 1 to 50, y and z are independently 0, 1 or 2 with the proviso that y+z must be at least 1.

5. The process of claim 3 wherein said reaction mixture additionally contains a tertiary amine-containing, isocyanate-reactive compound corresponding to the formula

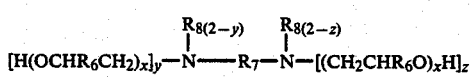

wherein

R6 is a straight or branched alkyl radical having 1 to 4 carbon atoms,

R7 is an alkylene, dialkylene ether or polyether diradical,

R8 is a straight or branched, saturated or unsaturated hydrocarbon chain having up to 30 carbon atoms which may optionally be substituted by ether, ester or amide groups, x is independently a number of about 1 to 50, y and z are independently 0, 1 or 2 with the proviso that y +z must be at least 1.

6. The process of claim 1 wherein said amidine group containing compound corresponds to the formula

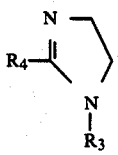

wherein

R4 contains a saturated or unsaturated fatty group and R3 is as previously defined above.

7. The process of claim 3 wherein said salt is the tall oil fatty acid salt of the amide group-containing amine obtained by reacting N,N-dimethylamino-propylamine with tall oil fatty acid.

8. A process for the production of an optionally cellular, polyurethane elastomer or an optionally cellular, rigid structural polyurethane by reacting a reaction mixture comprising (i) a polyisocyanate, (ii) a high molecular weight polymer having at least two hydroxy groups and a molecular weight of 400 to about 10,000, (iii) about 5 to 150% by weight, based on the weight of component (ii) of a chain extender having at least two hydroxy groups and a mold release agent mixture comprising, based on the weight of component (ii) and (iii), (iv) about 0.05 to 10% by weight, of a salt based on a carboxy functional siloxane and an amidine group-containing compound of the formula

wherein

R1, R2 and R3 are straight or branched, saturated or unsaturated hydrocarbon chains having up to 30 carbon atoms which may optionally be substituted by ether groups, ester groups, amide groups or amidine groups and may also optionally be terminated by isocyanate-reactive groups, R4 corresponds to the definition of R1, R2 and R3, but may additionally represent an aromatic substituent having 6 to 15 carbon atoms or may represent the group —NR2R3 and R1, R2, R3 and R4 may, with one or both of the amidine nitrogens, also form a heterocyclic ring, (v) a salt of an aliphatic carboxylic acid and a primary amine or a primary, secondary or tertiary amine containing an amide or an ester group and (vi) a tertiary amine-containing, isocyanate-reactive compound corresponding to the formula

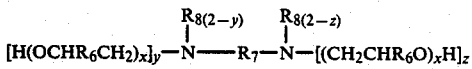

wherein

R6 is a straight or branched alkyl radical having 1 to 4 carbon atoms,

R7 is an alkylene, dialkylene ether or polyether diradical,

R8 is a straight or branched, saturated or unsaturated hydrocarbon chain having up to 30 carbon atoms which may optionally be substituted by ether, ester or amide groups, x is independently a number of about 1 to 50, y and z are independently 0, 1 or 2 with the proviso that y +z must be at least 1.

9. The process of claim 8 wherein the reaction mixture is processed as a one-shot system by the RIM process using an isocyanate index of about 70 to 120.

10. The process of claim 8 wherein said amidine group-containing compound corresponds to the formula

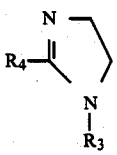

wherein

R4 contains a saturated or unsaturated fatty group and R3 is as previously defined above.

11. The process of claim 8 wherein said salt is a tall oil fatty acid salt of the amide group-containing amine obtained by reacting N,N-dimethylaminopropylamine with tall oil fatty acid.

* * * * *